United States Patent Office 3,553,248
Patented Jan. 5, 1971

3,553,248
METHOD OF RECOVERING ACRYLONITRILE MONOMER IN THE PRODUCTION OF A POLYMER
Eiichi Wakita and Kunio Tokumitsu, Fuji-shi, Japan, assignors to Asahi Kasei Kogyo Kabushiki Kaisha, Osaka, Japan, a corporation of Japan
Filed July 10, 1963, Ser. No. 294,101
Claims priority, application Japan, July 11, 1962, 37/28,518
Int. Cl. C07c *121/32*
U.S. Cl. 260—465.9            7 Claims

ABSTRACT OF THE DISCLOSURE

A method for the polymerization of acrylonitrile, said method comprising polymerizing acrylonitrile to produce a polymer slurry together with unpolymerized acrylonitrile, evaporating the unpolymerized acrylonitrile from the slurry, filtering the slurry which is now substantially free of unpolymerized acrylonitrile to produce a filtrate and a solid filtered polymer product, condensing the unpolymerized acrylonitrile by contacting the same with a cooling medium, said cooling medium being at a sufficiently low temperature to condense the gaseous monomer and being constituted by at least a portion of said filtrate, the condensed unpolymerized acrylonitrile in said cooling medium being recirculated together with the remaining portion of the filtrate for subsequent polymerization whereby substantially all of the acrylonitrile originally present may be polymerized.

---

The present invention is related to a method of recovering acrylonitrile monomer or other ethylenically unsaturated compounds present in a slurry containing polyacrylonitrile or the copolymer of acrylonitrile and one or more ethylenically unsaturated compounds.

The purpose of the present invention is to produce acrylic polymers with excellent whiteness and comparatively uniform distribution of molecular weight, so that it can be produced economically in good yield into fibers, tapes, ribbons, and films.

In the present industrial production some acrylonitrile monomer remains in the polymer slurry when produced either in a batch polymerization system or in a continuous system. This is especially true when the polymer desired should have excellent whiteness and comparatively uniform distribution of molecular weight. In this case the yield of polymerization is usually low, and it is very important to recover the monomer which remains in the system.

According to the usual method of recovering acrylonitrile monomer and the comonomer of ethylenically unsaturated compound, polymer slurry is filtered to separate polymer, and the filtrate is subjected to distillation to recover acrylonitrile and ethylenically unsaturated comonomer, which is then rectified for further use. In this method, however, it is difficult to recover the monomer and comonomer from their solution of high concentration due to the evaporation loss during the filtration of the polymer. Furthermore, the monomer concentration becomes very high in certain zones of the evaporator or the rectifier equipment as in the condensers, decanters, the pipe lines between the evaporators and the condensers, or inside the rectifier where the monomer tends to polymerize causing a blockage of the apparatus, thereby restricting the completion of the method. It is known that this phenomenon tends to happen when the compound such as sodium bisulfite is used as a polymerization catalyst which easily releases a volatile material on heating. The slurry and filtrate in the production of acrylic polymer tend to foam in the evaporator, causing difficulty in operating. When the slurry is subjected directly to the recovery of monomers by heating in a evaporator, the heat accelerates the coloration of the polymer. In addition, one of the important defects of the hitherto known methods of recovering monomers is that non-volatile ethylenically unsaturated monomer cannot be recovered.

A feature of the present invention requires that the polymer slurry be directly introduced into a vacuum evaporator to evaporate the monomers, and a condenser such as a water ejector or a jet condenser in which the monomer vapor directly contacts the cooling medium, and that all or part of the filtrate of polymer slurry, from which the monomers was recovered, can be used as the liquid stream of the ejector or the cooling medium thereof the jet condenser to evacuate the evaporator. In this way monomer vapor is condensed and absorbed into the liquid stream, and the solution can then be reused for further polymerization. It is possible to reduce the monomer concentration in the liquid stream by adding thereto together with the filtrate a portion of water to be newly charged into the polymerizer. One can also add only the newly charged water to the liquid stream and the filtrate is reused with the excess of the liquid stream, but the monomer concentration in the liquid stream tends to be increased in this method.

According to the method of the present invention, the temperature inside the evaporator can be controlled by adjusting the pressure, and the coloration of polymer can also be prevented. The vapor of acrylonitrile and ethylenically unsaturated comonomer present in the slurry are absorbed in the liquid stream of the ejector or the cooling medium of the jet condenser producing a very dilute cold solution of the monomer. Therefore, the apparatus is never blocked by polymer even if sodium bisulfite is used as one of the polymerization catalysts and sulfur dioxide contaminates the monomer solution. Besides, sulfur dioxide, which is the efficient component for the catalytic action of sodium bisulfite, can be recovered if the pH of the slurry is adjusted to 4.0–1.5 before vacuum distillation. When the slurry pH is below 1.5, the whiteness of the polymer deteriorates and the thermal stability decreases in whiteness when the pH is above 4.0. All or a part of the filtrate can be used as the liquid stream of the ejector or the cooling medium of the jet condenser and, when a part of the filtrate is used, the remainder of the filtrate is reusable for further polymerization. The filtrate contains such materials as non-volatile ethylenically unsaturated compound, unrecovered volatile monomer, still active catalysts, and water and thus the over-all rate of monomer recovery becomes very high. Ion-exchanged water is preferably used as the polymerization medium and its recovery makes the process economically advantageous. Polymer is separated from the slurry after the recovering of monomers by means of a dehydrater and the loss in this process is minute because of the very low monomer concentration. The relationship between the temperature of slurry in the evaporator and the whiteness of polymer depends upon the catalysts used, but the temperatures below 65° C. are generally desirable. If catalysts are used which tends to readily color the polymer, such as ammonium persulfate and thioglycolic acid, the temperatures below 50° C. are desirable. The pressure inside the evaporator which affords the desired temperature should be determined according to the amount of acrylonitrile and ethylenically unsaturated comonomer present in the slurry. The temperature of the liquid stream of the ejector or the cooling medium of the jet condenser is determined according to the design of the apparatus, the pressure inside the evaporator, and the amount of monomers to be recovered, but temperatures below 30° C. are desirable to prevent the polymerization of the recovered monomers. When monomer concentration in the liquid stream of the ejector or in the cooling medium of the jet condensed is low or the volatile catalyst is not present in the polymer slurry, then temperatures above 30° C. would not be harmful.

Occasionally, air is blown into the evaporator and is recycled after separation from the liquid stream of the ejector. In the case of using a jet condenser, the air sucked in and exhaled by an auxiliary pump is recycled. In this way, foaming of the slurry in the evaporator is completely prevented and the evaporation loss of the monomer is negligible because the air is recycled. In the case of using sodium bisulfite as a catalyst, consumption by oxidation is almost negligible except at the starting period of the apparatus because oxygen in the air is replaced by nitrogen during the recycle of the air. The amount of air to be blown into the apparatus may be determined by observation, but usually 0.1–10% of the vapor to be evaporated is desirable. One problem in the method stated above is the partial condensation of monomer in the pipe lines between the evaporator and the ejector or the jet condenser. If monomer condenses in the pipe line, the concentration is usually high and polymerization may occur resulting in the blockade of the pipe line. This difficulty was eliminated by warming the pipe line above the temperature of condensation by means of steam or electric heating.

Figure 1:
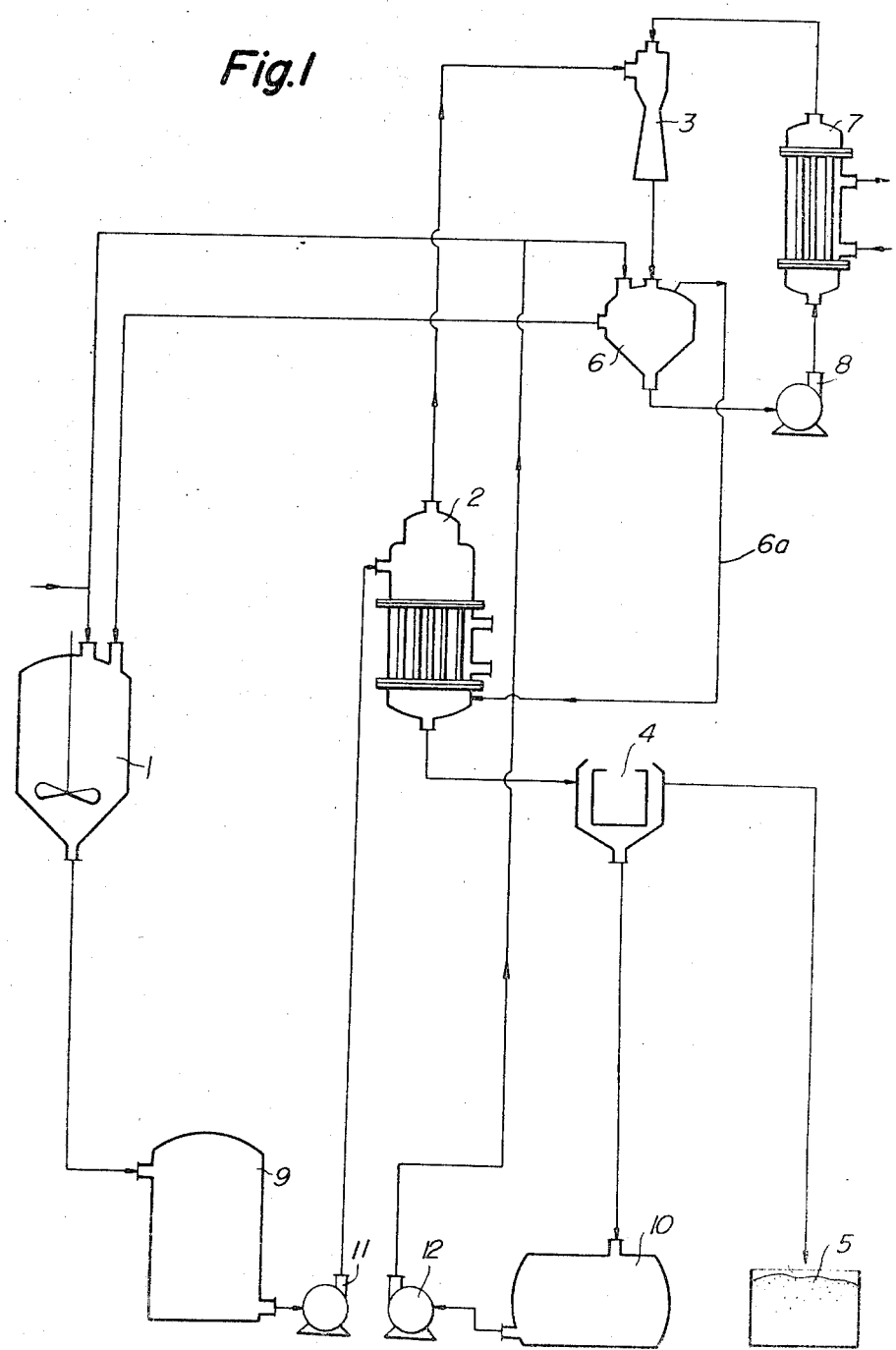
FIG. 1 is a diagrammatic illustration of a first embodiment of the invention with a water ejector.
Figure 2:
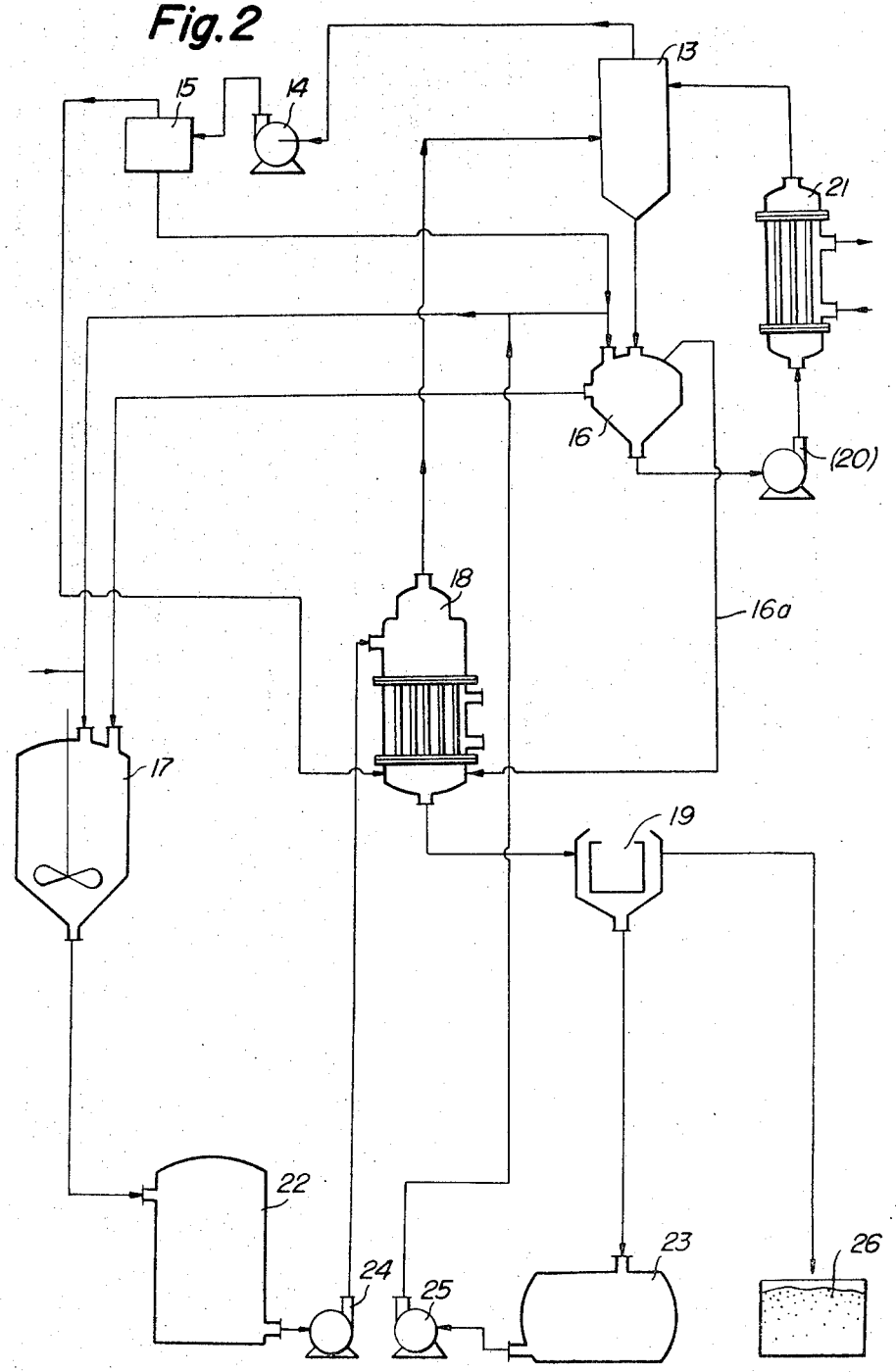
FIG. 2 is a diagrammatic illustration of a second embodiment of the invention with a jet condenser.

More specifically the present invention is explained by the following example shown in FIG. 1. Polymer slurry in polymerizer 1 is vacuum-distilled in the evaporator 2 with the help of the water ejector 3. Acrylontrile monomer in the slurry is evaporated, and absorbed in the stream of the water ejector, then the polymer is separated by the filter 4. All or part of the filtrate is sent to the intermediate tank 6 and is added to the stream of the water ejector. Any surplus of the mixture in the intermediate tank 6 is sent to the polymerizer and is reused. The stream of the water ejector is transferred by pump 8 to the heat exchanger 7 where it is cooled down to a specific temperature. If necessary, slurry tank 9, filtrate tank 10, slurry pump 11, filtrate pump 12, and polymer tank 5 may be used. When air is blown into the evaporator 2, pipe line 6a is used to recycle therethrough the air separated in the upper part of the intermediate tank 6 to the evaporator 2. As shown in FIG. 2 a jet condenser 13 is used, it is located in the place of the ejector 3 in FIG. 1 and noncondensable gas is sucked through the upper part of the jet condenser by a pump 14. A portion of the water which is to be fed into the polymerizer is used as the sealing water in the pump. The water from the pump is sent to the intermediate tank 16 through the gas-liquid separator 15 and is used as the cooling medium of the jet condenser as the gaseous monomer which does not condense in the jet condenser is absorbed. The water which is to be fed to the pump may be a part of the filtrate from polymer slurry or as a mixture with fresh water. Polymer is separated by the filter 19 after the slurry in the polymerizer 17 is subjected to vacuum-distillation in the evaporator 18 and the evaporated monomer is condensed and absorbed in the cooling medium of the jet condenser. All or part of the filtrate is sent to the intermediate tank 16 and is used as the cooling medium of the jet condenser. The surplus of the cooling medium is sent to the polymerizer 17 from the intermediate tank and is re-used for further polymerization. The cooling medium of the jet condenser is recycled by the pump 20 and its temperature is maintained constant by the heat exchanger 21. As was explained before, slurry tank 22, filtrate tank 23, slurry pump 24, filtrate pump 25, and polymer storage tank 26 may be used when needed. A water ejector is more convenient than a jet condenser because it is a combination of pump and condenser together, and a barometric leg is not required.

The present invention is applicable to the recovery of acrylonitrile and one or more ethylenically unsaturated compounds. The ethylenically unsaturated compounds include: styrene, α-methyl styrene and their ring-substituted derivatives (P-methyl styrene, O-ethyl styrene, P-chlorostyrene, P-nitro styrene, P-methyl α-methyl styrene, etc.), acrylic acid and methacrylic acid, their alkyl, aryl and aralkyl esters (methylacrylate, ethylacrylate, propylacrylate, butylacrylate, methyl methacrylate, ethyl methacrylate, propyl methacrylate, butyl methacrylate, etc. phenyl acrylate, α-naphthyl acrylate, phenyl methacrylate, β-naphthyl methacrylate, benzyl acrylate, etc.), acrylamide, methacrylamide, and their N-substituted derivatives (N-methylacrylamide, N-ethylacrylamide, N-butylacrylamide, N-methyl methacrylamide, N-ethyl methacrylamide, N-propyl methacrylamide, N,N-dimethyl acrylamide, N,N-diethyl acrylamide, N,N-diethylmethacrylamide, N,N-methyl ethyl methacrylamide, etc.), methacrylonitrile, ethacrylonitrile, and their homologues, unsaturated ketones such as methyl vinyl ketone, vinyl compounds such as vinylchloride, vinyl acetate, chlorovinyl acetate, vinyl propionate, vinyl butyrate, vinyl stearate, etc., vinylidene chloride, vinylidene cyanide, acrolein, itaconic acid, maleic acid, fumaric acid; monoalkyl esters, dialkyl esters, monoaryl esters, diaryl esters, monoaralkyl esters, diaralkyl esters, monoamides, diamides, mono N-alkyl amide, di-N-alkyl amide, and monoamide monoesters of itaconic, maleic, and fumaric acids (methyl itaconate, dimethyl itaconate, diethyl maleate, dipropyl fumarate, itacoamide, di-N-methyl itacoamide, etc.), vinyl ethyl ether, allyl alcohol, methallyl alcohol; vinyl compound containing sulfonic acid groups (vinyl sulfonic acid, methallyl sulfonic acid, P-styrene sulfonic acid, etc.), α-sulfoacrylonitrile sulfoalkylacrylate, sulfoalkylmethacrylate, sulfoarylacrylate, sulfoaryl methacrylate; and vinyl compound containing basic nitrogen atom (2-methyl-5-vinyl pyridine, 4-vinyl pyridine, N,N-diethyl aminoethyl methacrylate, vinylimidazol, etc.).

The remarkable efficiency of recovery in the present invention is explained in more detail in the following examples, where all the percentages and amounts are based on weight and $\eta_{sp./c.}$ was measured in dimethylformamide at 35° C. with the polymer concentration of 0.2 g./100 cc. $\eta_{sp./c.}$ refers to specific viscosity and c. to the polymer concentration in g./100 cc.

EXAMPLE 1

To 170 parts of water pH of which had been adjusted to 3.0 with sulfuric acid, were added 30 parts of acrylonitrile, 7.5% of ammonium persulfate, and 0.35% of thioglycolic acid based on the weight of acrylonitrile, respectively. The mixture was warmed to 45° C. for 4 hours for polymerization. Polymer obtained was 21 parts or 70% of the theoretical amount. The polymer had sufficient whiteness and a $\eta_{sp./c.}$ of 1.45. Shaping ability was considered to be acceptable.

The polymer slurry obtained above was sent to the tank 9 shown in FIG. 1, which is then fed to the evaporator 2 continuously to recover acrylonitrile. Conditions were controlled so that the pressure in the evaporator was 50 mm.-Hg (absolute), outlet temperature of the polymer slurry about 35° C. and the temperature of the liquid stream of the water ejector is 15° C. The polymer slurry from the evaporator was dehydrated until the water content thereof was about 180 parts by weight per 100 parts by weight of the polymer, and the entire filtrate was transferred to the intermediate tank 6. In the liquid stream of the water ejector were found 7.7 parts of acrylonitrile, 126 parts of water, and an amount of ammonium persulfate corresponding to 65% of the starting amount. This mixture was then used in the following polymerization without any difficulties and the polymer obtained was comparable to that obtained in the polymerization where recovered material was not used. Non-condensable gas separated in the upper part of the intermediate tank was blown into the evaporator in the ratio of about 1% of the amount of evaporation. There was no foaming in the evaporator nor blocking of apparatus. Overall yield of polymer was 91.4% and 65% of ammonium persulfate and 74% of water were retained for reprocessing. The acrylonitrile recovery ratio was 85.5%.

EXAMPLE 2

To 80 parts of water, pH of which has been adjusted to 2.0 were added 20 parts of acrylonitrile, 0.9 part of sulfopropylacrylate, 0.06 part of α,α'-azobisisobutyronitrile, and 0.08 part of thioglycolic acid. The mixture was warmed to 55° C. for 10 hours for polymerization and the polymer obtained from the slurry weighed 18.5 parts, which is 88.5% of the theoretical amount. The whiteness and shaping ability of the polymer were acceptable.

The polymer slurry obtained above was continuously fed to the evaporator 18 in the method shown in FIG. 2 to recover acrylonitrile. The pressure in the evaporator was maintained at 150 mm.-Hg (absolute, the slurry temperature at the exit of the evaporator was about 58° C., and the temperature of the liquid stream of the jet condenser 30–35° C. The slurry was dehydrated until the water content thereof was about 167 parts by weight per 100 parts by weight of the polymer after evaporation, and the entire filtrate was transferred to the intermediate tank 16. In the liquid stream of the jet condenser were found 2.17 parts of acrylonitrile, 0.036 parts of sulfopropyl acrylate, and 49.15 parts of water. This filtrate was then used in the subsequent polymerization and the polymer obtained was comparable to that obtained in the polymerization where no recycled water was employed. A portion of fresh water added to the polymerizer was fed to the pump 14 for sealing, and the drain was fed to the intermediate tank 16. The over-all yield of polymer was 99.0%, and about 60% of water and sulfopropylacrylate were recovered. The recovery ratio of acrylonitrile was 92.5%. The rate of air blown into the evaporator was about 0.5% of the amount of evaporation. Neither foaming in the evaporator nor blockade of the apparatus was observed.

EXAMPLE 3

| | Parts |
|---|---|
| Water | 900 |
| Acrylonitrile | 95 |
| Methyl acrylate | 5 |
| Sodium bisulfite | 3 |
| Potassium hydroxylamine disulfonate | 0.8 |
| Sulfuric acid | 0.2 |

The above compounds were continuously fed in the stated proportion into the polymerizer maintained at 55° C. so that the retention time was 4 hours. Polymer slurry, 1004 parts, discharged from the polymerizer was filtered, washed with water, and dried. White polymer obtained weighted 82 parts or 82% of the theoretical amount. $\eta_{sp./c.}$ of the polymer was 2.00 and the pH of the slurry was 2.5.

The slurry obtained above, 1004 parts, was continuously fed to the evaporator 2 to recover acrylonitrile and methyl acrylate as is shown in FIG. 1. The pressure in the evaporator was maintained at 50 mm. Hg (absolute), slurry temperature at the exit of the evaporator about 36–37° C., the temperature of the liquid stream of the water ejector about 20° C. The ratio of air blown into the evaporator was about 1.5% of the amount evaporation. The pipe line between the evaporator and the water ejector was heated with steam to prevent partial condensation. The results of analysis of the aqueous solution in the intermediate tank 6 per 1004 parts of slurry were as follows:

| | Parts |
|---|---|
| Water | 736 |
| Acrylonitrile | 16.8 |
| Methyl acrylate | 0.9 |
| Potassium hydroxylamine disulfonate | 0.16 |
| Sodium bisulfite | 0.5 |
| Sulfuric acid | 0.16 |

The above aqueous solution was continuously recycled to the polymerizer from the intermediate tank 6 and the polymer slurry containing the polymer of the same $\eta_{sp./c.}$ and whiteness was obtained in the following polymerization. Therefore, the amounts of the compounds newly added to the polymerizer to obtain 1004 parts of polymer slurry were as follows:

| | Parts |
|---|---|
| Water | 164 |
| Acrylonitrile | 78.2 |
| Methyl acrylate | 4.1 |
| Sodium bisulfite | 2.5 |
| Potassium hydroxylamine disulfonate | 0.64 |
| Sulfuric acid | 0.04 |

The overall yield of polymer was 99.6%, the recovery ratio of acrylonitrile and methyl acrylate was 98.3%, and those of hydroxylamine sulfonic acid, sodium bisulfite, sulfuric acid, and water were about 20%, 17%, 80%, and 82%, respectively. Neither foaming in the evaporator nor the blockade of the apparatus was observed.

EXAMPLE 4

The conditions of polymerization and the recovery were set up as follows in the same way as those of Example 3.

Polymerization temperature—62° C.
Retention time—6.7 hrs.
Pressure in the evaporator—70 mm. Hg (abs.)
Slurry temperature at the exit of evaporator—45–43° C.
Temperature of the stream of water ejector—20° C.
The amount of air blown into the evaporator—1.3% of the amount of evaporation As results, the amount of initial charge A and additive charge B to the polymerizer and the amount of recovery C were as follows:

| | A | B | C |
|---|---|---|---|
| | | (all in parts) | |
| Water | 900 | 244 | 656 |
| Acrylonitrile | 91.5 | 82.7 | 8.8 |
| Methyl methacrylate | 8.0 | 7.2 | 0.8 |
| Sodium methallyl sulfonate | 0.5 | 0.45 | 0.05 |
| Sodium bisulfite | 2.3 | 1.6 | 0.7 |
| Potassium hydroxylamine disulfonate | 0.9 | 0.7 | 0.2 |
| Sulfuric acid | 0.2 | 0.04 | 0.16 |

The amount of polymer for A was 90 parts or 90% yield. The pH of slurry was 2.5 and $\eta_{sp./c.}$ of the polymer was 1.45.

The over-all yield of polymerization was 99.6% and the recovery ratios of acrylonitrile, methyl methacrylate, sodium methallyl sulfonate, potassium hydroxylamine disulfonate, sodium bisulfite, sulfuric acid, and water were 96.5%, about 10%, 20%, 30%, 80%, and 73%, respectively. Neither foaming in the evaporator nor blockade of the apparatus was observed.

What is claimed is:

1. A method for the recovery of unpolymerized acrylonitrile in the polymerization of acrylonitrile in water, said method comprising polymerizing acrylonitrile in the presence of a redox catalyst to produce a polymer slurry together with unpolymerized acrylonitrile, evaporating under vacuum the unpolymerized acrylonitrile from the slurry, filtering the slurry which is now substantially free of unpolymerized acrylonitrile to produce a filtrate and a solid filtered polymer product, condensing the unpolymerized acrylonitrile by contacting the same directly with a cooling medium which is a jet condenser or a water ejector, said cooling medium being at a sufficiently low temperature to condense the gaseous monomer and being constituted by said filtrate, and recovering the unpolymerized acrylonitrile therefrom.

2. A method as claimed in claim 1, wherein the acrylonitrile is polymerized with an ethylenically unsaturated compound, the unpolymerized ethylenically unsaturated compound being evaporated under vacuum with the unpolymerized acrylonitrile and subsequently condensed therewith in said cooling medium.

3. A method as claimed in claim 1 comprising forming said cooling medium into a liquid stream which is directly contacted with and condenses the evaporated unpolymerized acrylonitrile.

4. A method as claimed in claim 1 wherein air is blown into the polymer slurry in the evaporating zone at a rate of between 1 to 10 g. per kg. of evaporation.

5. A method as claimed in claim 4 wherein the air is recycled through a condensing zone.

6. A method as claimed in claim 1 comprising heating the vaporized unpolymerized acrylonitrile after vacuum evaporation thereof to maintain the same in gaseous state until it is directly contacted with the cooling medium.

7. A method as claimed in claim 1 comprising adding water to the cooling medium to reduce the concentration of acrylonitrile therein.

References Cited

UNITED STATES PATENTS

| | | | |
|---|---|---|---|
| 2,956,995 | 10/1960 | Knight | 260—94.9 |
| 3,002,958 | 10/1961 | Wilkinson | 260—85.5 |
| 3,008,938 | 11/1961 | Irvin | 260—94.2X |

JOSEPH P. BRUST, Primary Examiner

U.S. Cl. X.R.

260—293, 309.6, 413, 481, 485, 486, 488, 505, 513, 526, 537, 561, 593, 601, 614, 632, 645, 651, 656, 668, 669